United States Patent [19]

Ewald et al.

[11] 4,194,719

[45] Mar. 25, 1980

[54] HYDRAULIC CONTROL VALVE

[75] Inventors: Roland Ewald; Herbert Lembke, both of Lohr, Fed. Rep. of Germany

[73] Assignee: G. L. Rexroth GmbH, Lohr, Fed. Rep. of Germany

[21] Appl. No.: 896,765

[22] Filed: Apr. 17, 1978

[30] Foreign Application Priority Data

Apr. 20, 1977 [DE] Fed. Rep. of Germany ....... 2717384

[51] Int. Cl.[2] .................... F15B 13/043; F16K 31/124

[52] U.S. Cl. ................................. 251/30; 137/625.64; 137/625.66; 251/31

[58] Field of Search ................................. 91/461, 459; 137/625.63, 625.64, 625.66, 625.6; 251/30, 31

[56] References Cited

U.S. PATENT DOCUMENTS

| | | | |
|---|---|---|---|
| 2,767,689 | 10/1956 | Moog, Jr. | 137/625.62 |
| 3,228,423 | 1/1966 | Moog, Jr. | 137/625.63 X |
| 3,513,877 | 5/1970 | Tennis | 137/625.63 X |
| 4,023,593 | 5/1977 | Piccardo | 137/625.64 |
| 4,114,650 | 9/1978 | Gordon | 137/625.63 X |

*Primary Examiner*—Irwin C. Cohen

*Attorney, Agent, or Firm*—Michael J. Striker

[57] ABSTRACT

A multi-position flow control valve comprises a control piston movable in a boring in two opposite directions. At each end of the boring a pressure chamber is provided accommodating a pressure spring supported on a spring collar that at its end facing the boring has a conical recess. Each recess accommodates a conical projection of a supporting rod that is slidably guided in a blind end bore provided in the control piston. A spring is arranged in the blind end to urge the supporting rod into engagement with the recess in the spring collar. If a pressure fluid is introduced into one pressure chamber, it displaces the piston and compresses the biasing spring in the other pressure chamber whereby the spring biased supporting rods remain in engagement with the recesses in the spring collars.

3 Claims, 1 Drawing Figure

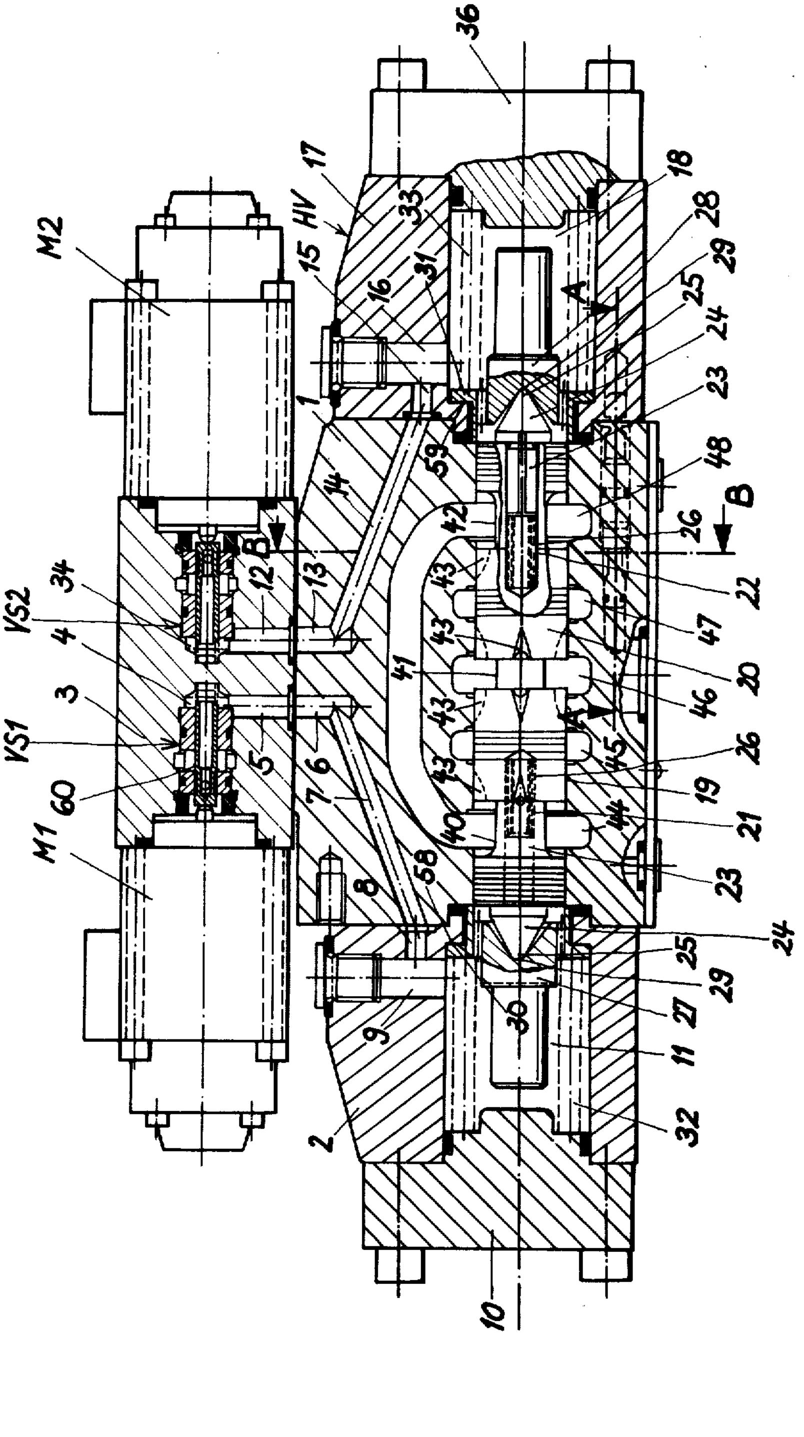
M2
M1
VS2
VS1
HV
A
B
36
17
33
18
28
29
25
24
23
15
16
31
1
14
59
48
26
22
47
20
46
45
19
21
42
43
41
40
44
12
13
34
4
3
5
6
7
8
58
60
9
30
27
11
32
2
10

HYDRAULIC CONTROL VALVE

BACKGROUND OF THE INVENTION

This invention relates generally to hydraulically operable control valves and in particular it relates to a multi-position flow control valve including a control piston movable in two opposite directions, a spring biasing the piston in one direction into a neutral position and a pressure fluid inlet for hydraulically urging the piston in the opposite direction.

The pressure fluid inlet is controlled via an electrically operable presetting valve that increases or reduces the inlet opening proportionally to an electrical control signal and in this manner it can gradually increase or reduce the inlet flow of the pressure fluid. The quality of the control valve of this type is determined among other factors by the accuracy of reproduction of adjusted values. The recurrent accuracy of the set values depends above all on the precision with which the movable parts subject to frictional losses as well as mutually engageable component parts have been manufactured.

The primary object of this invention is to improve to a substantial degree the accuracy of reproduction of adjusted values in control valves of the above described type.

SUMMARY OF THE INVENTION

According to this invention, the above object is attained by providing the ends of the control piston of the valve with axial blind end bores for guiding respectively a spring biased supporting rod having a projecting cone shaped tip; pressure springs located in each blind bore urge the supporting rods into engagement with corresponding recesses in spring collars arranged respectively opposite the ends of the control piston. The spring collars are spring biased to urge the piston to a neutral or rest position. When control pressure fluid is applied against one end of the piston, the latter is displaced against the forces of the opposite spring biased collar and is shifted relative to its supporting rods but the conical tips of the supporting rods remain in engagement with the recesses in the collars.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

The single FIGURE is a sectional side view of a preferred embodiment of the hydraulically controlled valve of this invention.

DESCRIPTION OF THE PREFERRED EMBODIMENT

In the drawing, HV denotes the main control valve and VC1 and VC2 denote presetting control valves arranged in a common housing block 3 and actuated respectively by electromagnets M1 and M2. The outlet space 4 of the presetting control valve VC1 is connected via a channel 5 with channels 6, 7 and 8 in the housing block 1 of the main control valve and via a channel 9 in a housing block 2 of a pressure chamber 11 with boring 19 in the housing block 1. The outlet space 34 of the other presetting control valve VC2 is similarly connected via a channel 12 in housing block 3, channels 13 and 14 in housing block 1, channels 15 and 16 and a pressure chamber 18 in the housing block 17 to the other ends of the boring 19. A control piston 20 is slidably arranged for a reciprocal movement in the boring 19 in the main housing block 1. The end surfaces of the control piston 20 are each provided with a blind end bore 21 and 22 for guiding cylindrical extension 23 of a cone-shaped supporting member 24 having a rounded tip 25. Pressure springs 26 are arranged in respective blind end bores 21 and 22 for urging the cone-shaped supporting members 24 and their cylindrical extensions 23 in the direction of respective spring collars 27 and 28. The end surfaces of the spring collars 27 and 28 facing the control piston 20 are provided with conical recesses 29 for receiving and supporting the cone-shaped supporting members 24 of the control piston 20. Rim portion 30 of the spring collar 27 and a corresponding rim portion 31 of the spring collar 28 support respectively one end of the pressure springs 32 and 33 whereas the other end of the springs 32 and 33 abuts against the collars 10 and 36 of the pressure chambers 11 and 18.

The control valve piston 20 defines on its cylindrical surface continuous annular recesses 40, 41 and 42 as well as grooves 43 for fine adjustment that after displacement of the control valve in one or the other direction interconnect pressure control spaces 44, 45, 46, 47 and 48 in the housing block 1 of the main control valve. The pressure control space 46 is connected to a pump, for example, the spaces 45 and 47 communicate with working conduits and spaces 44 and 48 are connected to each other by a bypass channel 49 and are connected to a reservoir, for instance.

The operation of the control valve of this invention is as follows:

If an electrical control signal is applied to the electromagnet M1 for example, the resulting electromagnetic force corresponding to the magnitude of the input control signal displaces the control piston 60 of the presetting valve VC1 in the opening direction. As a result a control fluid pressure proportional to the magnetic force of the electromagnet M1 is built up in the outlet space 4 of the presetting valve VC1 and exerts force against control piston 60 in the closing direction. At the same time due to the connection of the outlet space 4 with the pressure chamber 11 of main control valve HV this pressure acts also on the end surface of the main control valve 20 and displaces the same against the force of pressure spring 33 in the direction of the opposite pressure chamber 18; the piston 20 moves so long til the increasing spring force of the pressure spring 33 is in balance with the pressure acting against the piston. During this movement of the piston 20 in the direction of the pressure chamber 18, the spring collar 28 remains in its rest position shown in the drawing in which its rim portion 30 abuts against the stationary surface 58 of the housing block 2. The cone shaped end portion of the supporting rods 24 remains in positive connection with respective spring collars 27 due to the bias of the pressure spring 26 that during the displacement of the control piston 20 maintains the supporting rod 24 in engagement with the conical recess of the spring collar 27. The control piston 20 is thereby displaced relative to the cylindrical extension 23 of the supporting member 24. The mutual position of the contact surfaces 25 and 29 between the supporting member 24 and the spring collar 27 cannot be changed in either direction of travel of the control piston 20. Similarly, no displacement can take place between cone-shaped portion 24 and the conical recess 25 at the other end of the piston 20 even if the piston travels in the direction of the pressure chamber 11. In this case, the spring collar 28 remains in the position as shown in the drawing, in which its flange 31 abuts upon the stationary surface 59 of the pressure chamber housing 70 while the force of the pressure spring 26 of the supporting member 24 keeps rounded tip 25 in engagement with a corresponding contact surface 29 of the spring collar 28.

It has proved that in spite of additional guiding surfaces in the blind end bores 26 for the supporting members 23 and 24, errors in the reproduction or resetting of adjusted values have been reduced about 50 percent. The reproduction accuracy of the set values is is no longer impaired by position changes between the end of the control piston and the facing spring collar.

While the invention has been illustrated and described as embodied in a specific embodiment of the control valve, it is not intended to be limited to the details shown since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A multi-position flow control valve comprising: a housing having an elongated boring and a plurality of control spaces opening into said boring, a control piston movable in two opposite directions in said boring and cooperating at each end thereof with spring means and pressure fluid inlet means, the surface of said piston being formed with a plurality of recesses selectively communicating with said control spaces, said spring means including a first pressure spring supported between said housing and a spring collar, said collar abutting upon the housing and being movable against the associated first spring, each end of said control piston having an axial blind end bore, a supporting rod axially movable in said bore, a second spring located in said bore and urging said rod into engagement with a matching recess in said spring collar, said pressure fluid inlet means being selectively actuated to apply pressure against one end of said piston and displace the same against the first pressure spring in the opposite spring means whereby the second springs in said blind recesses maintain the supporting rods of said piston in engagement with the associated spring collars.

2. A control valve as defined in claim 1, wherein said pressure fluid inlet means include two presetting control valves for selectively applying pressure against one end of said control piston.

3. A control valve as defined in claim 2, wherein said spring means are arranged in a pressure chamber each communicating with one of said presetting control valves.

* * * * *